(12) United States Patent
Sekii

(10) Patent No.: US 6,510,128 B2
(45) Date of Patent: Jan. 21, 2003

(54) OPTICAL STORAGE MEDIUM HAVING MULTIPLE RECORDING LAYERS OF DIFFERENT FORMATS

(75) Inventor: Yasuaki Sekii, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/864,430

(22) Filed: May 24, 2001

(65) Prior Publication Data

US 2001/0022761 A1 Sep. 20, 2001

Related U.S. Application Data

(62) Division of application No. 09/397,808, filed on Sep. 17, 1999.

(30) Foreign Application Priority Data

Sep. 18, 1998 (JP) .............................. 10-265278

(51) Int. Cl.$^7$ ................................. G11B 7/24
(52) U.S. Cl. ...................... 369/275.3; 369/94
(58) Field of Search .................... 369/275.3, 275.1, 369/94, 281, 280, 286; 428/64.1, 64.4

(56) References Cited

U.S. PATENT DOCUMENTS

| 5,742,569 | A | | 4/1998 | Yamamoto et al. ............ 369/32 |
|---|---|---|---|---|
| 5,828,648 | A | * | 10/1998 | Takasu et al. ............ 369/275.1 |
| 6,072,759 | A | * | 6/2000 | Maeda et al. .................. 369/59 |
| 6,137,766 | A | * | 10/2000 | Utsumi .................... 369/275.1 |
| 6,141,299 | A | * | 10/2000 | Utsumi .................... 369/275.1 |
| 6,160,787 | A | * | 12/2000 | Marquardt, Jr. et al. . 369/275.1 |
| 6,343,060 | B1 | * | 1/2002 | Ko .......................... 369/275.1 |

FOREIGN PATENT DOCUMENTS

| EP | 0718845 | 12/1995 |
|---|---|---|
| GB | 2295715 | 11/1995 |

* cited by examiner

Primary Examiner—Tan Dinh
(74) Attorney, Agent, or Firm—Jay H. Maioli

(57) ABSTRACT

A disc recording medium has recorded thereon a first program in a first recording area and corresponding first management data for managing readout of the first program and providing information, such as track number and play time, to the user. The disc recording medium also has a second program recorded in a second recording area and corresponding second management data for managing readout of the second program. The second management data includes only an absolute time code and track start time codes, but no track numbers or play times, and the track numbers are derived using the second management data.

5 Claims, 18 Drawing Sheets

|   | d₁ | | | | | | | d₈ |
|---|---|---|---|---|---|---|---|---|
|   | P | Q | R | S | T | U | V | W |
| 0 | | SYNCHRONOUS PATTERN S₀ | | | | | | |
| 1 | | SYNCHRONOUS PATTERN S₁ | | | | | | |
| 2 | | 96 × 1 BITS | | | | | | |
| . | | | | | | | | |
| 97 | | | | | | | | |

FIG.2

| S₀, S₁ | CONTROL | | | | ADR | Q DATA | CRC | S₀, S₁ |
|---|---|---|---|---|---|---|---|---|
| 0 1 | 2 | 3 | 4 | 5 | .... | 72 BITS | ... 97 | |

96 BITS

FIG.3

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 0 | 0 | 0 | CONTROL | | CHANNEL NUMBER | | 0 | 0 | CATEGORY CODE | | | | | | |
| 16 | | | SOURCE NUMBER | | | | | | fs | | | | CLOCK ACCURACY | | |
| 32 | | | | | | | | | | | | | | | |
| 48 | | | | | | | | | | | | | | | |
| 64 | | | | | | | | | | | | | | | |
| 80 | | | | | | | | | | | | | | | |
| 96 | | | | | | | | | | | | | | | |
| 112 | | | | | | | | | | | | | | | |
| 128 | | | | | | | | | | | | | | | |
| 144 | | | | | | | | | | | | | | | |
| 160 | | | | | | | | | | | | | | | |
| 176 | | | | | | | | | | | | | | | |

FIG.7

| | 0 | 1 | 2 | 3 | 4 | 5 | 6 | 7 | 8 | 9 | 10 | 11 |
|---|---|---|---|---|---|---|---|---|---|---|---|---|
| 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 |
| 24 | 1 | Q1 | R1 | S1 | T1 | U1 | V1 | W1 | 0 | 0 | 0 | 0 |
| 36 | 1 | Q2 | R2 | S2 | T2 | U2 | V2 | W2 | 0 | 0 | 0 | 0 |
| . | . | . | . | . | . | . | . | . | . | . | . | . |
| 1164 | 1 | Q96 | R96 | S96 | T96 | U96 | V96 | W96 | 0 | 0 | 0 | 0 |
| 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 |
| 24 | 1 | Q1 | R1 | S1 | T1 | U1 | V1 | W1 | 1 | Q2 | R2 | S2 |
| 36 | T2 | U2 | V2 | W2 | 0 | 0 | 0 | 0 | 0 | 0 | 0 | 0 |
| 48 | 1 | Q3 | R3 | S3 | T3 | U3 | V3 | W3 | 0 | 0 | 0 | 0 |
| 60 | 0 | 0 | 0 | 0 | 1 | Q4 | R4 | S4 | T4 | U4 | V4 | W4 |
| 72 | 1 | Q5 | R5 | S5 | T5 | U5 | V5 | W5 | 0 | 0 | 0 | 0 |
| . | . | . | . | . | . | . | . | . | . | . | . | . |

FIG.8

| No. | PREAMBLE SYNC | AUX | AUDIO SAMPLES | | | | MSB | V | U | C | P |
|---|---|---|---|---|---|---|---|---|---|---|---|
| 1 | B | 0000 | 0000 | XXXX | XXXX | XXXX | XXXX | 0 | 0 | C1L | P |
| 2 | W | 0000 | 0000 | XXXX | XXXX | XXXX | XXXX | 0 | 0 | C1R | P |
| 3 | M | 0000 | 0000 | XXXX | XXXX | XXXX | XXXX | 0 | 0 | C2L | P |
| 4 | W | 0000 | 0000 | XXXX | XXXX | XXXX | XXXX | 0 | 0 | C2R | P |
| 5 | M | 0000 | 0000 | XXXX | XXXX | XXXX | XXXX | 0 | 0 | C3L | P |
| 6 | W | 0000 | 0000 | XXXX | XXXX | XXXX | XXXX | 0 | 0 | C3R | P |
| 7 | M | 0000 | 0000 | XXXX | XXXX | XXXX | XXXX | 0 | 0 | C4L | P |
| 8 | W | 0000 | 0000 | XXXX | XXXX | XXXX | XXXX | 0 | 0 | C4R | P |
| 9 | M | 0000 | 0000 | XXXX | XXXX | XXXX | XXXX | 0 | 0 | C5L | P |
| 10 | W | 0000 | 0000 | XXXX | XXXX | XXXX | XXXX | 0 | 0 | C5R | P |
| 11 | M | 0000 | 0000 | XXXX | XXXX | XXXX | XXXX | 0 | 0 | C6L | P |
| 12 | W | 0000 | 0000 | XXXX | XXXX | XXXX | XXXX | 0 | 0 | C6R | P |
| 13 | B | 0000 | 0000 | XXXX | XXXX | XXXX | XXXX | 0 | 0 | C7L | P |
| 14 | B | 0000 | 0000 | XXXX | XXXX | XXXX | XXXX | 0 | 0 | C7R | P |
| 15 | B | 0000 | 0000 | XXXX | XXXX | XXXX | XXXX | 0 | 0 | C8L | P |
| 16 | B | 0000 | 0000 | XXXX | XXXX | XXXX | XXXX | 0 | 0 | C8R | P |
| 17 | B | 0000 | 0000 | XXXX | XXXX | XXXX | XXXX | 0 | 0 | C9L | P |
| 18 | B | 0000 | 0000 | XXXX | XXXX | XXXX | XXXX | 0 | 0 | C9R | P |
| 19 | B | 0000 | 0000 | XXXX | XXXX | XXXX | XXXX | 0 | 0 | C10L | P |
| 20 | B | 0000 | 0000 | XXXX | XXXX | XXXX | XXXX | 0 | 0 | C10R | P |
| 21 | B | 0000 | 0000 | XXXX | XXXX | XXXX | XXXX | 0 | 0 | C11L | P |
| 22 | B | 0000 | 0000 | XXXX | XXXX | XXXX | XXXX | 0 | 0 | C11R | P |
| 23 | B | 0000 | 0000 | XXXX | XXXX | XXXX | XXXX | 0 | 0 | C12L | P |
| 24 | B | 0000 | 0000 | XXXX | XXXX | XXXX | XXXX | 0 | 0 | C12R | P |

FIG.9

| No. | PREAMBLE SYNC | AUX | AUDIO SAMPLES | | MSB | V | U | C | P |
|---|---|---|---|---|---|---|---|---|---|
| 25 | M | 0000 | 0000 | XXXX | XXXX | 0 | 1 | C13L | P |
| 26 | W | 0000 | 0000 | XXXX | XXXX | 0 | Q1 | C13R | P |
| 27 | M | 0000 | 0000 | XXXX | XXXX | 0 | R1 | C14L | P |
| 28 | W | 0000 | 0000 | XXXX | XXXX | 0 | S1 | C14R | P |
| 29 | M | 0000 | 0000 | XXXX | XXXX | 0 | T1 | C15L | P |
| 30 | W | 0000 | 0000 | XXXX | XXXX | 0 | U1 | C15R | P |
| 31 | M | 0000 | 0000 | XXXX | XXXX | 0 | V1 | C16L | P |
| 32 | W | 0000 | 0000 | XXXX | XXXX | 0 | W1 | C16R | P |
| 33 | M | 0000 | 0000 | XXXX | XXXX | 0 | 0 | C17L | P |
| 34 | W | 0000 | 0000 | XXXX | XXXX | 0 | 0 | C17R | P |
| 35 | M | 0000 | 0000 | XXXX | XXXX | 0 | 0 | C18L | P |
| 36 | W | 0000 | 0000 | XXXX | XXXX | 0 | 0 | C18R | P |
| 37 | M | 0000 | 0000 | XXXX | XXXX | 0 | 1 | C19L | P |
| 38 | W | 0000 | 0000 | XXXX | XXXX | 0 | Q2 | C19R | P |
| 39 | M | 0000 | 0000 | XXXX | XXXX | 0 | R2 | C20L | P |
| 40 | W | 0000 | 0000 | XXXX | XXXX | 0 | S2 | C20R | P |
| 41 | M | 0000 | 0000 | XXXX | XXXX | 0 | T2 | C21L | P |
| 42 | W | 0000 | 0000 | XXXX | XXXX | 0 | U2 | C21R | P |
| 43 | M | 0000 | 0000 | XXXX | XXXX | 0 | V2 | C22L | P |
| 44 | W | 0000 | 0000 | XXXX | XXXX | 0 | W2 | C22R | P |
| 45 | M | 0000 | 0000 | XXXX | XXXX | 0 | 0 | C23L | P |
| 46 | W | 0000 | 0000 | XXXX | XXXX | 0 | 0 | C23R | P |
| 47 | M | 0000 | 0000 | XXXX | XXXX | 0 | 0 | C24L | P |
| 48 | W | 0000 | 0000 | XXXX | XXXX | 0 | 0 | C24R | P |

FIG.10

| | #bytes | format | value |
|---|---|---|---|
| Track_List_2 ( ) { | | | |
| Track_List_2 Signature | 8 | string | "SACDTRL2" |
| for (ton=1;ton<=N_Tracks;ton++) | | | |
| { | | | |
| Track_Start_Time_Code [ton] | 3 | Time_Code | 0 |
| reserved | 1 | Uint8 | 0 |
| } | | | |
| Reserved | Until 1028 | Uint8 | 0 |
| for (ton=1;ton<=N_Tracks;ton++) | | | |
| { | | | |
| Track_Time_Length [ton] | 3 | Time_Code | 0 |
| Track_Flags [ton] | 1 | Track_Flags | 0 |
| } | | | |
| Reserved | Until 2048 | Uint8 | 0 |
| } | | | |

FIG.12

```
Index_List ( ) {                              #bytes      format     value
    Index_List_Signature                        8         string     "SACD_Ind"
    for (ton=1;ton<=N_Tracks;ton++)
    {
        Index_Ptr [ton]                         2         Uint16
    }
    Reserved                                 Until 524    Uint8      0
    for (ton=1;ton<=N_Tracks;ton++)
    if (Index_Ptr [ton]>0)
    {
        N_Stored_Indexes [ton]                  1         Uint8      1..255
        for (x=1;x<=N_Stored_Indexes [ton];x++)
        {
            Index_Start_TC [ton] [x+1]          3                    Time_Code
        }
    }
    Reserved                                 Until eos    Uint8      0
}
```

FIG.13

|  | #bytes | format | value |
|---|---|---|---|
| Audio_Header ( ) { | | | |
| N_Packs | 3 | Uint3 | 1..7 |
| N_Frame_Starts | 3 | Uint3 | 1..7 |
| Reserved | 2 | | 0 |
| for (p=1;p<=N_Packets;p++) | | | |
| Packet_Info ( ) [p] | 16 | Packet_Info | |
| for (f=1;f<=N_Frame_Starts;f++) | | | |
| Frame_Info ( ) [f] | 48 | Frame/Info | |
| } | | | |

FIG.14

```
Frame_Info ( ) [f] {
    Time_Code
    if (Frame_Format==0/*==LLC*/)
    {
        Reserved
        N/Sector [f]
        Buffer_Occupancy [f]
    }
}
```

|  | #bytes | format | value |
|---|---|---|---|
|  | 24 | Time_Code |  |
|  |  |  |  |
|  | 2 | Uint8 | 0 |
|  | 4 | Uint4 | 0 |
|  | 18 | Uint18 | 0 |

FIG.15

| AREA TOC | | | |
|---|---|---|---|
| | TRACK LIST2 | | |
| | TRACK START TIME CODE | | INDEX LIST |
| | | | | | INDEX START TIME CODE |
| | TN01 | 0M10S00F (TC₁) | INDEX 2 | 2M10S00F | |
| | | | INDEX 3 | 3M10S00F | |
| | | | .... | .... | |
| | | | INDEX M | 4M10S00F | |
| | TN02 | 5M30S00F (TC₂) | INDEX 2 | 6M10S00F | |
| | | | INDEX 3 | 8M10S00F | |
| | | | .... | .... | |
| | TN03 | 10M20S00F (TC₃) | INDEX 2 | 12M30S00F | |
| | TN0N | (TC_N) | ... | ... | |

FIG.16

OPTICAL STORAGE MEDIUM HAVING MULTIPLE RECORDING LAYERS OF DIFFERENT FORMATS

This is a division of prior application Ser. No. 09/397,808 filed Sep. 17, 1999.

BACKGROUND OF THE INVENTION

1. Field of the Invention

This invention relates to a reproduction method and also to a reproduction apparatus adapted to transmit a first digital signal for main data of a piece of music and additional data accompanying the main data and including the number of the piece of music and the elapsed time on the track and a second digital signal for main data of the piece of music and accompanying absolute time data on a common digital interface.

2. Related Background Art

The digital audio interface output of known compact disk (CD) players is adapted to produce, in addition to main data that are digital audio data, channel status data including a category code for identifying the CD category of the CD disk to be played and user data comprising Q codes, each including a track number and the elapsed time of a piece of music on the track.

On the other hand, many known digital recording apparatus using a digital audio tape (DAT) or a mini-disk (MD) as recording medium are designed to automatically record start IDs and track numbers on the recording medium for a great convenience of the user on the basis of the CD category identified by decoding the channel status data and the sub-data including the track numbers and the elapsed time of each piece of music recorded on the CD to be replayed as detected by decoding the Q code of the user data when receiving data from the CD player by way of the digital audio interface.

Meanwhile, in recent years, standards for optical disks that are different from known CDs and adapted to record high speed 1-bit digital audio signals for music have been proposed. Audio data addressed by the proposed standards are 1-bit audio signals obtained by subjecting corresponding analog audio signals to a delta-sigma ($\Delta\Sigma$) modulation process. A 1-bit audio signal is sampled with a very high sampling frequency that is 64 times as high as the sampling frequency of 44.1 KHz of ordinary CDs. The signal is expressed in terms of a very high sampling frequency and a data word length with a very small number of quantization bits and hence characterized by a wide transmission frequency band. Additionally, due to the $\Delta\Sigma$ modulation, it can secure a wide dynamic range in the audio band that is a low frequency band relative to the over-sampling frequency that is 64 times as high as the sampling frequency of ordinary CDs.

An optical disk deals with high speed 1-bit audio signals conforming to the proposed standards for new digital audio signals and shows audio characteristics by far more excellent than those of known CDs. However, a recording system totally different from that of known CDs has to be used for it and hence is not compatible with known CDs in terms of information on the track numbers and the elapsed time of each piece of music as contained in the sub-data as well as other data.

Therefore, when producing a digital audio interface output in a disk replaying apparatus adapted to digital audio signals conforming to the proposed new standards, the category code of the channel status data, the user data and other data generally have to be newly defined and managed.

However, the use of such newly defined data is totally detrimental to the above identified convenience of recording start Ids and track numbers on the recording medium when the data are recorded by way of the digital interface to a known digital recording apparatus.

Particularly, with a reproduction apparatus adapted to both digital audio disks conforming to the new standards and existing CDs, there arises a confusing situation where the above convenience is available when replaying with a CD whereas it is not available when replaying a new disk to a great inconvenience on the part of the user of the apparatus.

SUMMARY OF THE INVENTION

In view of the above identified circumstances, it is therefore an object of the present invention to provide a reproduction method and a reproduction apparatus adapted to use channel status data and user data in the format equivalent to that of CDs for the digital audio interface output when replaying a disk for digital audio signals recorded with a system different from that of CDs so that the convenience of automatically recording starts Ids and track numbers on the digital recording medium such as DAT or mini-disk can be ensured as in the case of a CD.

Another object of the present invention is to provide a reproduction apparatus and a reproduction method adapted to use channel status data and user data in the format equivalent to that of CDs for the digital audio interface output particularly in the case of a reproduction apparatus adapted to both digital audio disks conforming to the new standards and existing CDs.

According to an aspect of the invention, the above objects are achieved by providing a reproduction apparatus adapted to selectively replaying a first recording medium having a program area storing a plurality of programs formatted according to a first format and sub-data including at least the passed-by addresses of each program and the program numbers; and a second recording medium having a program area storing a plurality of programs formatted according to a second format different from said first format and sub-data accompanying said programs and including absolute addresses and a control area for controlling recording addresses expressed in terms of absolute addresses and corresponding the programs stored in said program area;

said reproduction apparatus comprising:

a reproduction means for replaying the control area and the program area of said second recording medium;

a memory means for storing recording addresses expressed in terms of absolute addresses and corresponding to the programs recorded in the control area of said second recording medium and replayed by said reproduction means;

a sub-data generation means for generating the program number and the passed-by addresses of the program currently being reproduced on the basis of the absolute addresses reproduced from the program area of said second recording medium by the recording addresses as expressed in terms of absolute addresses and corresponding to the programs stored in said memory means and also by said reproduction means; and an interface output means for receiving as input the passed-by addresses and the program number of each of the programs reproduced from the program area of said first recording medium when replaying said first recording medium and receiving the passed-by addresses and the program number of the program currently being reproduced as generated by said sub-data generation means, transforming them and outputting them to a predetermined digital interface when replaying said second recording medium.

According to another aspect of the invention, there is provided a reproduction apparatus adapted to selectively replaying a first layer having a program area storing a plurality of programs formatted according to a first format and sub-data including at least the passed-by addresses of each program and the program numbers and a second layer having a program area storing a plurality of programs formatted according to a second format different from said first format and sub-data accompanying said programs and including absolute addresses and a control area for controlling recording addresses expressed in terms of absolute addresses and corresponding the programs stored in said program area;

said reproduction apparatus comprising:

a reproduction means for selectively replaying the program area of said first layer and the control area and the program area of said second layer;

a memory means for storing recording addresses expressed in terms of absolute addresses and corresponding to the programs recorded in the control area of said second layer and replayed by said reproduction means;

a sub-data generation means for generating the program number and the passed by addresses of the program currently being reproduced on the basis of the absolute addresses reproduced from the program area of said second layer by the recording addresses as expressed in terms of absolute addresses and corresponding to the programs stored in said memory means and also by said reproduction means; and an interface output means for receiving as input the passed-by addresses and the program number of each of the programs reproduced from the program area of said first layer when replaying said first layer and receiving the passed-by addresses and the program number of the program currently being reproduced as generated by said sub-data generation means, transforming them and outputting them to a predetermined digital interface when replaying said second layer.

BRIEF DESCRIPTION OF THE DRAWINGS

FIG. 2 is a schematic illustration of the data structure of a sub-coding frame format applicable to known CDs.

FIG. 3 is a schematic illustration of the frame data structure of a Q data applicable to known CDs.

FIG. 7 is a schematic illustration of the data structure of channel status data.

FIG. 8 is a schematic illustration of the data structure of user data when the category of channel status data indicates the CD category.

FIG. 9 is a schematic illustration of the data structure when a sub-frame conforming to the Digital Audio Interface Standards is used as user data.

FIG. 10 is a schematic illustration of the data structure when a sub-frame conforming to the Digital Audio Interface Standards is used as channel status data.

FIG. 12 is an illustration of the data table that may be recorded in the track list in an area TOC data.

FIG. 13 is an illustration of the data table that may be recorded in the index list in an area TOC data.

FIG. 14 is an illustration of the data table of an audio header in the audio sector of each track.

FIG. 15 is an illustration of the data table of frame info in the audio header of each track.

FIG. 16 is a specific example of table of the track list and the index list in an area TOC data.

DESCRIPTION OF THE PREFERRED EMBODIMENTS

Now, the present invention will be described by referring to the accompanying drawings that illustrate preferred embodiments of reproduction apparatus and reproduction method according to the invention.

The embodiment of reproduction apparatus according to the invention as described hereinafter is adapted to replay music from a compact disk (CD) and also from a novel optical disk storing high speed 1-bit digital audio signals and also output audio signals conforming to the Digital Audio Interface Standards. An optical disk of the new type storing high speed 1-bit digital audio signals will be referred to as an HD (high definition) disk hereinafter.

Each high-speed 1-bit audio signal recorded on an HD disk is obtained by means of delta-sigma ($\Delta\Sigma$) modulation of an analog audio signal and has a data format of a data word length of 1-bit and a sampling frequency of 2,8224 MHz (44.1 KHz×64).

Figure 1:
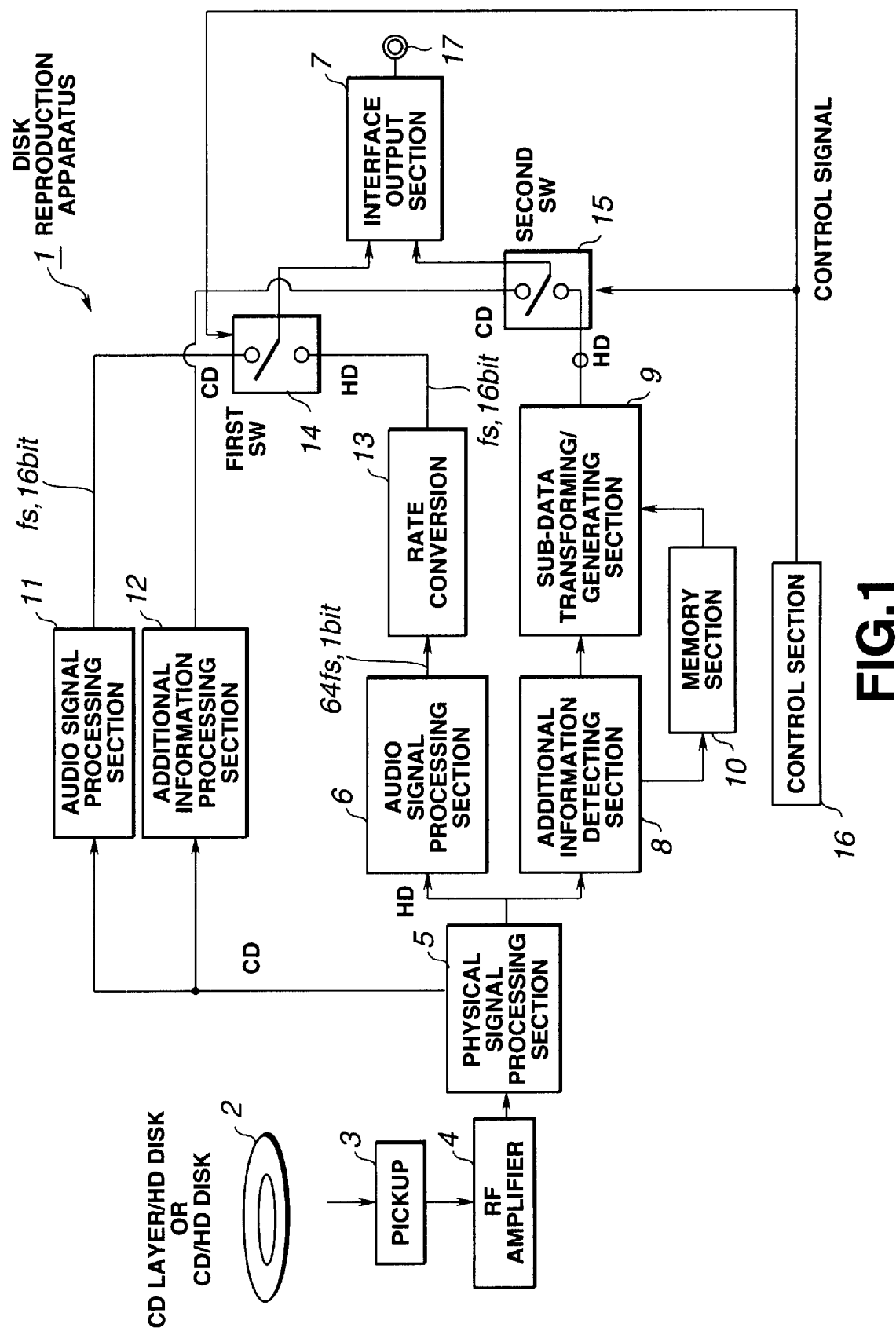
FIG. 1 is a schematic block diagram of a disk replaying apparatus embodied according to the invention.

FIG. 1 is a schematic block diagram of disk replaying apparatus 1 embodied according to the invention.

Referring to FIG. 1, optical disk 2 is a multilayer disk comprising a first layer storing multi-bit digital audio signals in the conventional CD format and a second layer storing 1-bit digital audio signals in the new format referred to as the HD format.

In a different mode of carrying out the invention, a reproduction apparatus may be so arranged as to selectively carry and drive a conventional CD or another device storing 1-bit digital audio signals in the HD format.

The signal read out from the optical disk 2 by means of optical pickup 3 is input to physical signal detector/processor 5 by way of RF amplifier 4.

In the case where the optical disk 2 is an HD disk or an HD layer, the physical signal detector/processor 5 carries out an operation of physically processing the signal including EFM plus demodulation, product coding and descrambling and transmits a 1-bit delta-sigma modulated digital audio signal having a sampling frequency of fs multiplied by 64 (64×44 KHz=2.8224 MHz) to audio signal processor 6 and additional information detector/processor 8.

On the other hand, in the case where the optical disk 2 is a CD, the physical signal detector/processor 5 carries out an operation of physically processing the signal including EFM demodulating and CIRC (cross interleaved Reed-Solomon coding) and transmits a digital audio signal sampled with a sampling frequency of fs (44.1 KHz) and having a quantization bit number of 16 bits to audio signal processor 11 and additional information detector/processor 12.

The audio signal processor 6 demodulates the 1-bit digital audio signal that is reproduced from the optical disk 2 and sampled with the sampling frequency of fs multiplied by 64 (64×44.1 KHz=2.8224 MHz) and the rate converter 13 down-converts the 1-bit digital audio signal sampled with the sampling frequency fs multiplied by 64 (64×44.1 KHz= 2.8224 MHz) to a multi-bit digital audio signal having a sampling frequency of f2 (44.1 KHz) and a quantization bit number of 16 bits that are equivalent with those of a CD and transmits it to one of the terminals of first switch 14.

On the other hand, the additional information detector/processor 11 demodulates the digital audio signal having a quantization bit number of 16 bits that is reproduced from the optical disk 2 and sampled with the sampling frequency of fs (44.1 KHz) and transmits to the other terminal of the first switch 14.

Then, the multi-bit digital audio signal selected by the first switch 14 is fed to interface output section 7.

The digital audio interface output section 7 outputs the multi-bit digital signal typically as digital audio interface output conforming to the IEC958 format.

The additional information detector/processor 8 separates all the information other than the audio signal from the data string containing said 1-bit digital audio signal. More specifically, it detects time information TCP, which will be described hereinafter, from the header information contained in said data string and transmits it to sub-data converter/generator 9. Additionally, it extracts information on the start time of each track and that of each index such as track start time codes and index start time codes from the control information arranged at the head and the trail of said data string and stores the extracted information in memory 10.

The sub-data converter/generator 9 converts and generates sub-data such as channel status data and user data that conform to the Digital Interface Standards on CDs by means of said time information TCP fed from the additional information detector/processor and said track start time information and index start time information stored in said memory 10.

The sub-data generates by the sub-data converter/generator 9 such as channel status data and user data to one of the terminals of second switch 15.

On the other hand, the additional information detector/processor 12 separates all the information other than the audio signal from the data string containing said multi-bit digital audio signal. Additionally, it extracts information conforming to the Digital Interface Standards on CDs such as channel status data and user data and transmits it to the other terminal of switch 15.

Then, the sub-data such as channel status data and user data selected by said switch 15 are transmitted to said digital audio interface output section 7 and synthetically combined with the multi-bit digital audio signal from the audio signal processor 6 or the audio signal processor 11. Then, it outputs the obtained data conforming to the Digital Audio Interface Standards to digital output terminal 1.

The first switch 14 and the second switch 15 are controlled for their switching operations by a control signal output from the control section 16 on the basis of the outcome of the operation of determining if a CD or an HD or if a CD layer or an HD layer, whichever appropriate, is to be handled.

Now, sub-data, or channel status data and user data conforming to the CD Standards, that can be converted and generated by the sub-data converter/generator 10 by means of the additional information extracted from the 1-bit digital audio signals from the optical disk 2 will be discussed hereinafter.

According to the CD Standards, there are sub-data (P, Q, R, S, T, U, V, W) formed on a frame by frame basis that can be read out when the disk is driven for ordinary replay on a track by track basis. FIG. 2 is a schematic illustration of the data structure of a sub-coding frame format of a compact disk audio system (conforming to the IEC (International Electro-technical Commission) 908 Standard). Sub-data P through W are contained in each frame by 98 bits including sync bits $S_0$ and $S_1$ for a sync pattern. P represents information on the interval between two pieces on a track and R through W represent information on still pictures and characters. Q represents most of the information converted and generated by the additional information detector/processor 9 including track numbers and the elapsed time on each of the tracks as well as the absolute time (minute, second, frame).

FIG. 3 shows a format applicable to a Q code. The 96 bits other than the sync bits of $S_0$ and $S_1$ include 4 CONTROL bits indicating the presence or absence of emphasis and if copying the piece is permitted or prohibited, 4 address (ADR) bits indicating the data mode, 72 Q data bits and 16 cyclic redundancy check (CRC) bits for the generation of parity check codes. The number of address (ADR) bits will be reduced to 1 when the data in the program area are being reproduced.

Figure 4:
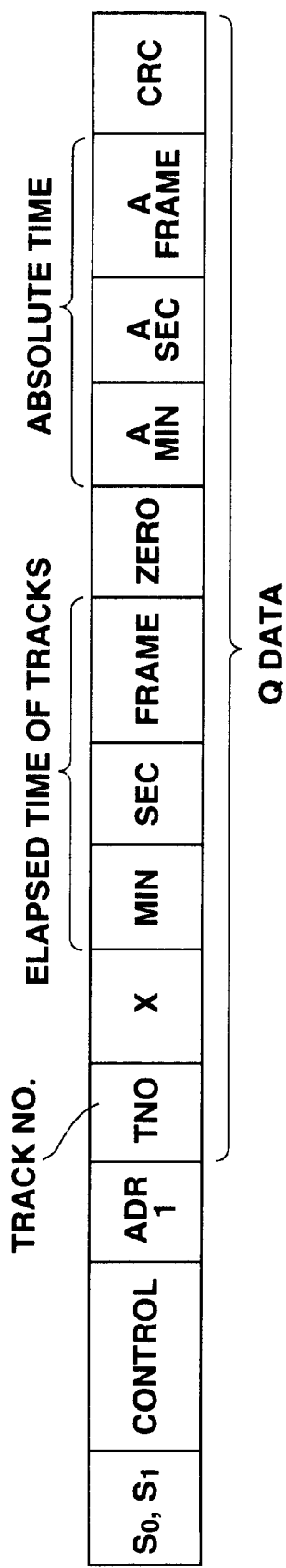
FIG. 4 is a schematic illustration of the frame data structure of a Q data in a program area applicable to known CDs.

FIG. 4 is a schematic illustration of the frame data structure of a Q data including only an address (ADR) bit. It includes track no TNO, index number X, the elapsed time on the track (minute (MIN), second (SEC), frame (FRAME)), the absolute time (minute (AMIN), second (ASEC), frame (AFRAME) from the head of the disk and CRC. Note that the elapsed time on the track is that of a track with a specific track number.

Figure 5:
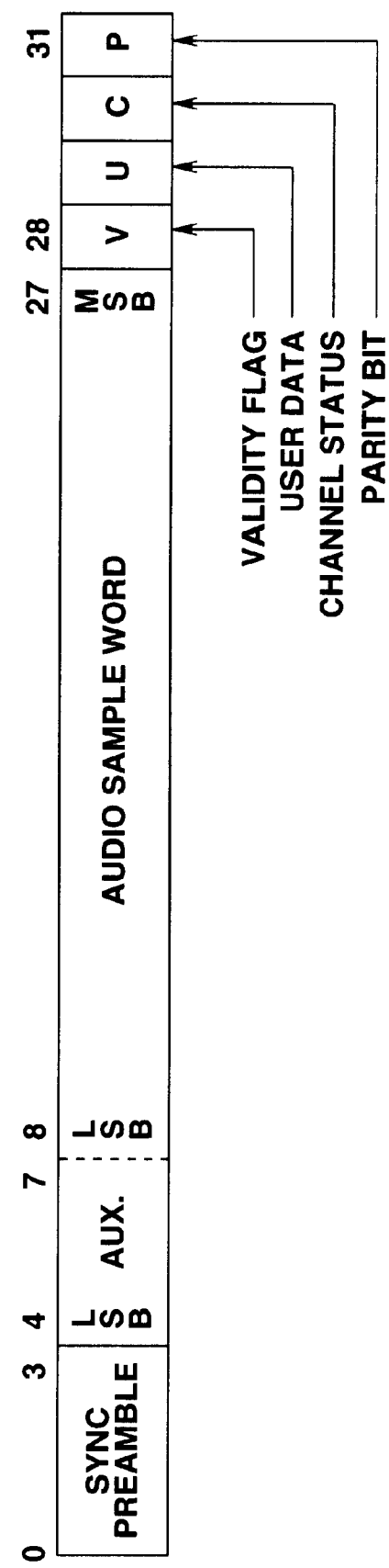
FIG. 5 is a schematic illustration of the data structure of a sub-frame conforming to the Digital Audio Interface Standards.
Figure 6:
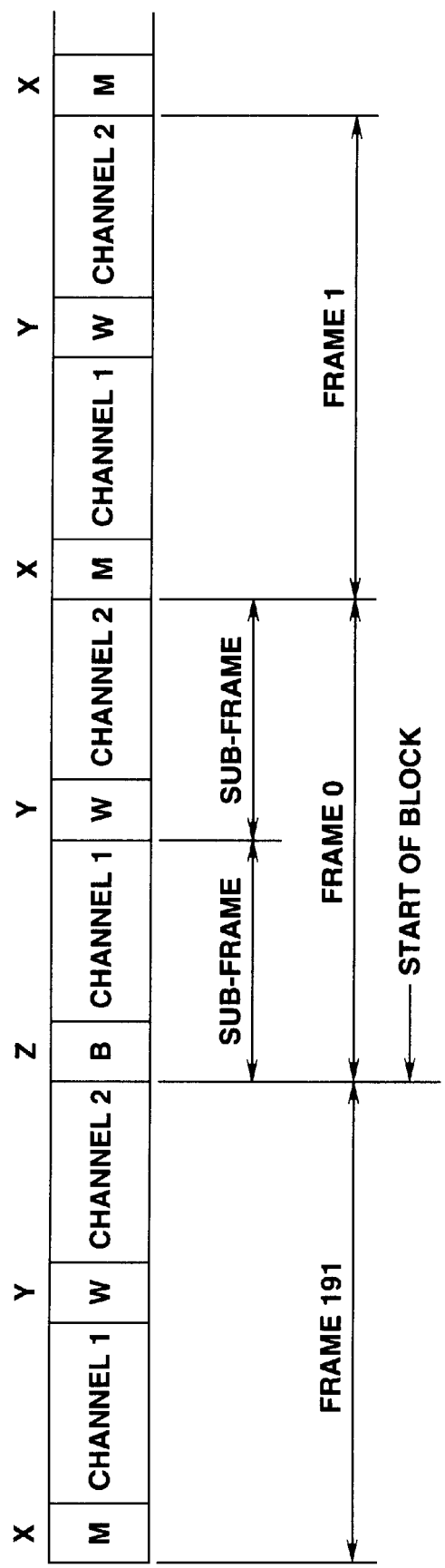
FIG. 6 is a schematic illustration of the data structure of a frame conforming to the Digital Audio Interface Standards.

FIG. 5 is a schematic illustration of the data format of a sub-frame conforming to the Digital Audio Interface Standards (IEC 958 Standards). FIG. 6 is a schematic illustration of the data structure of a frame containing sub-frames as shown in FIG. 5.

The synchronization preamble (Sync Preamble), user data (U bit), channel status data (C-bit) and other data exist in each frame in addition to audio data for the left and right channels.

FIG. 7 is a schematic illustration of the data format of channel status data. The data contains a category code for identifying the type of apparatus, the sampling frequency fs and CONTROL bits for indicating the presence or absence of emphasis.

FIG. 8 is a schematic illustration of the data format of a user data when the category code of FIG. 7 is "10000000", indicating that the signal source is a CD reproduction apparatus. Here, codes Q through W are listed to exclude P code and, particularly, the 96 bits Q code will be extracted therefrom.

FIG. 9 and FIG. 10 show examples of data including user data (U) and channel status data (C) that can be actually output along with audio data.

Thus, as described above, a digital output of a CD player contains channel status data indicating the CD category and user data indicating the track number and the elapsed time of the track.

On the other hand, according to the above described newly established standards for optical disks (typically referred to as Super Audio CD Standards), a start address that corresponds to the absolute time of the start of a track in the audio area is written in Track_List_2 in the area TOC data. Only the time code contained in the initial header of each audio sector that corresponds to the absolute time of the start can be read out during an ordinary operation of reproducing data from a track.

Figure 11A:
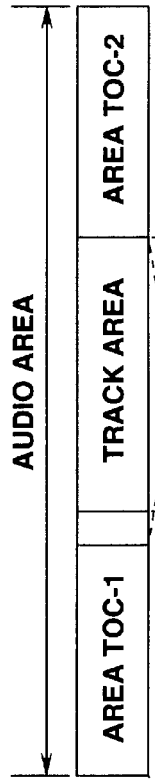
FIG. 11A is a schematic illustration of the data structure of an HD disk applicable to the present invention.
Figure 11B:
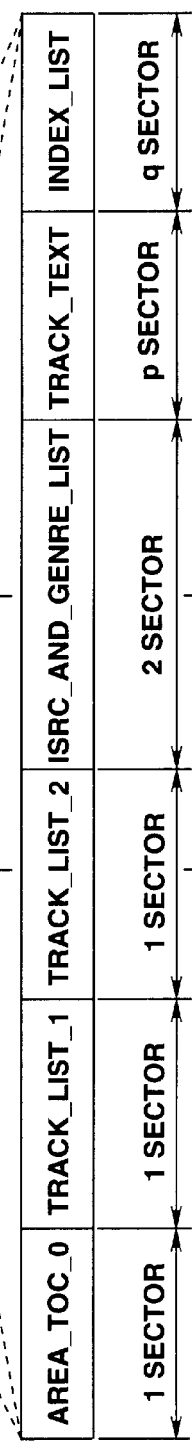
FIG. 11B is a detailed illustration of the data structure of area TOC shown in FIG. 11A.

FIG. 11A is a schematic illustration of the data structure of the audio area on an optical disk conforming to the Standards, where each of the two area TOCs arranged on the opposite sides of the track area has a configuration as shown in FIG. 11B. Track_Start_Time_Code of each track is described in Track_List_2 in the area TOC as shown in the syntax of FIG. 12. Index start time code Index_Start_TC of each index number as shown in the syntax of FIG. 13 is described in Index_List of FIG. 11B.

Figure 11C:
FIG. 11C is a detailed illustration of the data structure of the track area shown in FIG. 11A.
Figure 11D:
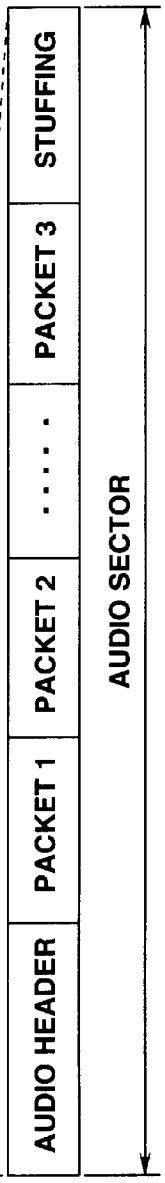
FIG. 11D is a detailed illustration of the data structure of each track of the track area shown in FIG. 11A.

On the other hand, Audio Sector as shown in FIG. 11D is provided on each track as shown in FIG. 11C in the track area of FIG. 11A and Frame_Info as shown in the syntax of FIG. 14 is described in Audio Header in the Audio Sector. More specifically, Time_Code of each frame is described there as shown in FIG. 15.

As described above, according to the HD standards, only the time code (absolute time) of each frame can be read out from a track area that is a program area during an ordinary operation of reproducing data from a track unlike the CD format. In other words, information such as track numbers and the elapsed time of each track is not recorded. Therefore, it is not possible to display track numbers and the elapsed time of each track.

In order to overcome this inconvenience, the disk replaying apparatus 1 frrstly reads out area TOC (Table of Contents) data and stores it in memory 8 as shown in FIG. 1 when a disk is placed in position. Thus, the memory 8 stores a table of TRACK LIST 2 and INDEX LIST as shown in FIG. 16.

Figure 17:
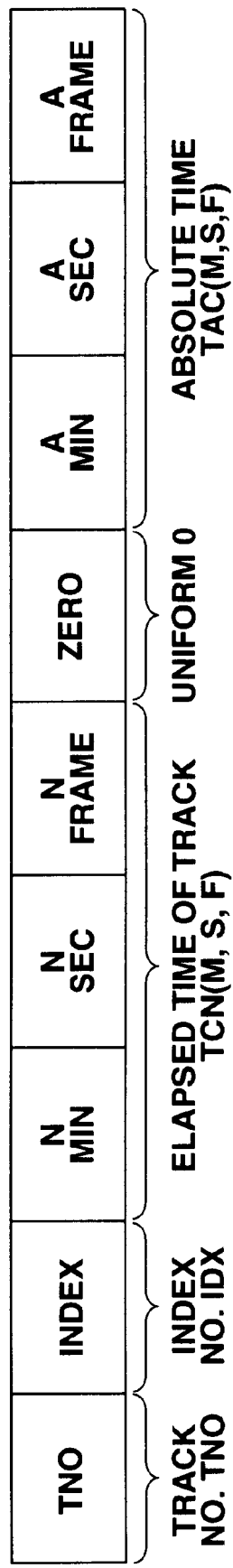
FIG. 17 is a schematic illustration of the data structure of a sub-Q-data.

For driving the optical disk 2 for data reproduction and adding user data (U bit) to its digital output, Q data as shown in FIG. 17 has to be produced by additional information detector/processor 9 through a data conversion/generation process.

Now, a conversion processing operation of a sub-data will be described by referring to FIG. 18. Firstly, the time code (absolute time) of the audio header has to be read out as TCP for each frame while th_e optical disk 2 is driven for data reproduction. Then, in Step S1, the absolute time TCA (minute M, second S, frame F) of the TCP is written as shown in FIG. 17.

Then, in Step S2, Track_Start_Time_Code (TC2) of Track No. 2 (TNO 2) is compared with the above TCP. If TCP is smaller than TC2, the operation proceeds to Step S3, where the current track number is specified as TNO 1. In Step S4, TC1 of Track Number 1 (TNO. 1) is subtracted from the TCP to produce elapsed time TCN (minute, second, frame).

Figure 18:
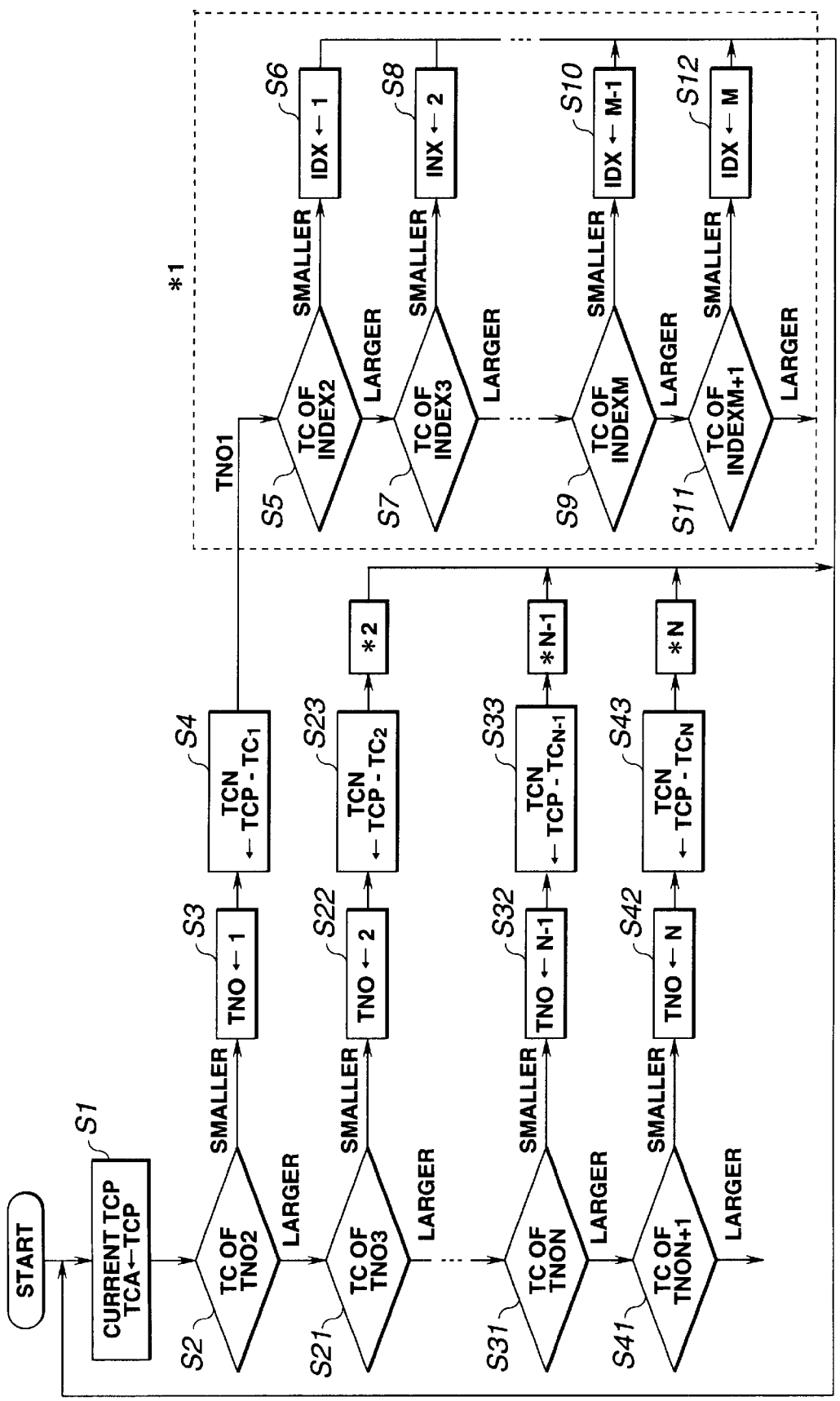
FIG. 18 is a flow chart of the operation of generating track numbers, index numbers and elapsed time that can be used for the purpose of the invention.

After Step S4, the operation proceeds to the processing sequence of *1 surrounded by broken lines in FIG. 18, where the index number (IDX) in the track number TNO 1 is determined.

In Step S5, Index_Start_TC of INDEX 2 of the track number TNO. 1 in Index_List is compared with the above TCP. If the above TCP is smaller than Index_Start_TC of INDEX 2, the operation proceeds to Step S6, where the index number is determined to be equal to "1". If, on the other hand, it is found in Step S5 that the above TCP is greater than Index_Start_TC of INDEX 2, the operation proceeds to Step S7, where Index_Start_TC of INDEX 3 of the track number TNO. 1 is compared with the above TCP. If the above TCP is smaller than Index_Start_TC of INDEX 3, the operation proceeds to Step S8, wheere the index number is determined to be equal to "2". If, on the other hand, it is found in Step S7 that the above TCP is greater than Index_Start_TC of INDEX 3, the operation proceeds to Step S9, where Index_Start_TC of INDEX of the track number TNO. 1 is compared with the above TCP. If the above TCP is smaller than Index_Start_TC of INDEXM, the operation proceeds to Step S10, where the index number is determined to be equal to "M−1". If, on the other hand, it is found in Step S9 that th above TCP is greater than Index_Start_TC of INDEXM, the operation proceeds to Step S11, where Index_Start_TC of INDEXM of the track number TNO. 1 is compared with the above TCP. If the above TCP is smaller than Index_Start_TC of INDEXM+1, the operation proceeds to Step S12, where the index number is determined to be equal to "M".

Then, the operation returns to Step S2 and if it is found in Step S2 that the above TCP is greater than the above TC2, the operation proceeds to Step S2, where Track_Start_Time_Code (TC3) of Track Number (TNO. 3) is compared with the above TCP. If the above TCP is smaller than TC3, the operation proceeds to Step S22, where the current track number TNO. is determined to be equal to "2". Then, in Step S23, TC2 of the track number TNO. 2 is subtracted from TCP to obtain the elapsed time TCN (minute, second, frame).

After the above Step S23, the operation proceeds to the processing sequence of *2 surrounded by broken lines, where the index number (IDX) in the track number INO. 2 is determined. Since this sequence is similar to that of *1 above, it will not be described here any further.

Then, in Step S31, if the above TCP is smaller than TCN of the tack number N (TNO. N), the operation proceeds to Step S32, where the current track number TNO. is determined to be equal to N−1. In Step S33, TC(N−1) of the track number TNO. (N−1) is subtracted from TCP to obtain the elapsed time TCN (minute, second, frame).

After the above Step S33, the operation proceeds to the processing sequence of *N−1 surrounded by broken lines, where the index number (IDX) in the track number TNO. N−1 is determined. Since this sequence is similar to that of *1 above, it will not be described here any further.

If it is found in Step S31 that the above TCP is greater than the N-th TCN of the track number TNO, the operation proceeds to Step S41, where Track_Start_Time_Code (TCN+1) of the track number N+1 (TNO. N+1) is compared with the above TCP. If it is found that TCP is smaller than TCN+1, the operation proceeds to Step S42, where the current track number TNO is determined to be equal to "N".

Then, in Step S43, TCN of the track number N (TCN. N) is subtracted from TCP to obtain the elapsed time TCN (minute, second, frame).

After the above Step S43, the operation proceeds to the processing sequence of *N surrounded by broken lines, where the index number (IDX) in the track number TNO. N is determined. Since this sequence is similar to that of *1 above, it will not be described here any further.

Then, in the disk replaying apparatus 1, the sub-data converter/generator 9 turns TCP into absolute time TCA as shown in FIG. 18, using TCP read out by the additional information detector/processor 8 and the table stored in the memory 10 as shown in FIG. 16. Thereafter, the disk replaying apparatus 1 compares the track start time code of each track with TCP, starting from the track number TNO. 2. TNO of FIG. 17 that is greater than the N-th TC of the track number TNO and smaller than the N+1-th TC will be equal to N. The value obtained by subtracting the N-th TC of TNO from TCP represents the elapsed time of the track TCN (minute, second, frame) of FIG. 17. Then, each index start time code of TNO. N in the index list is compared with TCP to determine the current index number (IDX). Thus, Q data as shown in FIG. 17 can be prepared with the above described flow of operation of conversion/generation. Then, fixed value data such as CONTROL and address ADA shown in FIG. 4 are added thereto to produce complete Q data.

If the current absolute time is 7 minute, 40 second, 33 frame in the list of area TOC shown in FIG. 16, then the track number TNO will be "2" and the elapsed time TCN will be 2 minute, 10 second, frame 33, whereas IDX will be "2".

Figure 19:
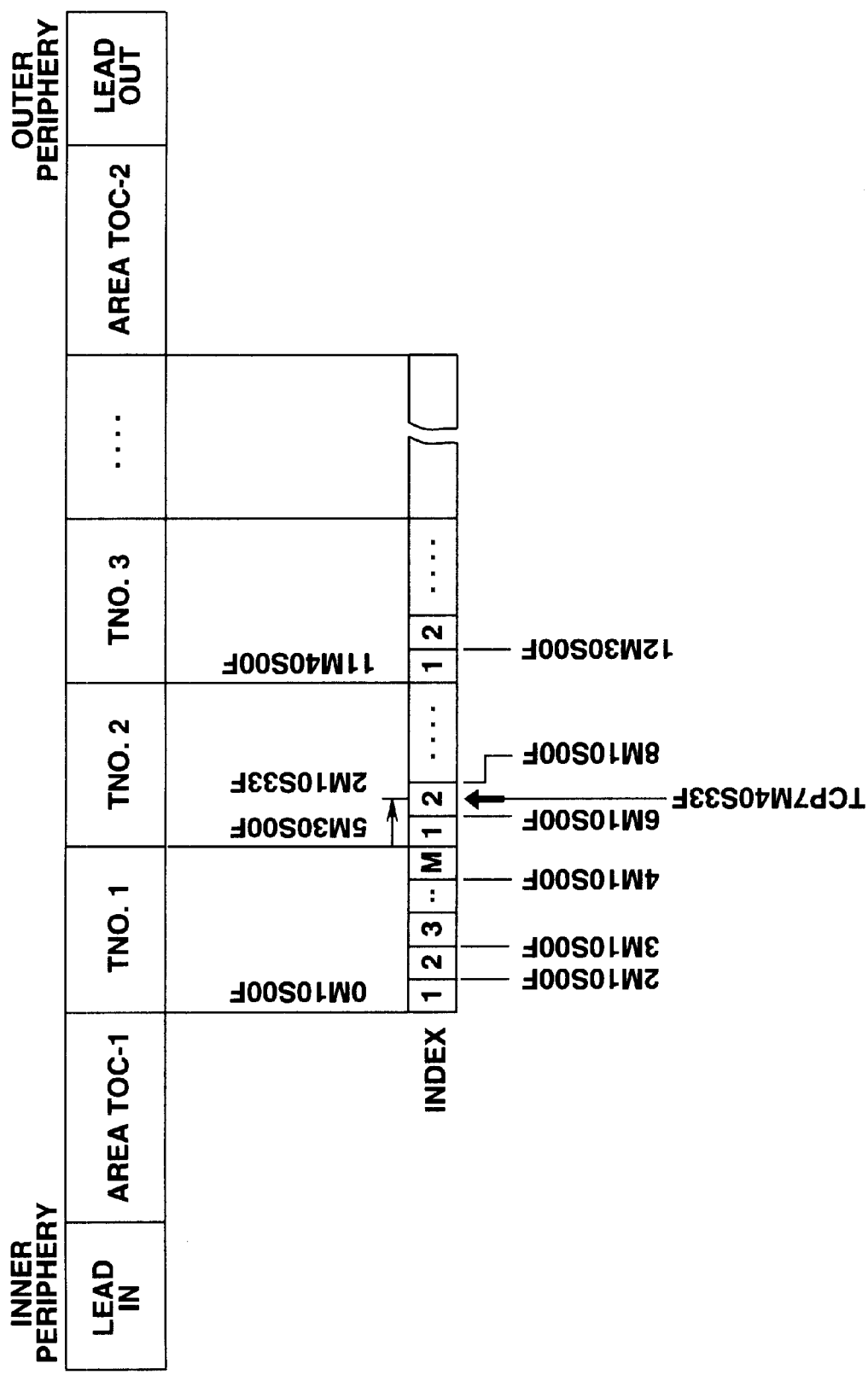
FIG. 19 is a schematic illustration of the data structure indicating track numbers, index numbers and start times that can be actually generated on the basis of the table of FIG. 16.

Now, the operation of the above embodiment will be described further by referring to the flow chart of FIG. 18 and also to FIG. 19.

Firstly, TCP "7 minute, 40 second, 33 frame" as read out by the additional information detector/processor 9 is written into TCA of FIG. 17. Then, Track_Start_Time_Code (TC2) "5 minute, 30 second, 00 frame" of the track with the track number 2 (TNO.2) is compared with the above TCP. Since TCP is greater than TC2, the operation proceeds to Step S21, where Track_Start_Time_Code (TC3) "11 minute, 40 second, 00 frame" of the track with the track number 3 (TNO. 3) is compared with the above TCP. Since TCP is smaller than TC3, the operation proceeds to Step S22, where the track number TNO is made equal to "2". Then, in Step S23, TC2 is subtracted from TCP to obtain 2 minutes, 10 seconds, 33 frames as TCN, or the elapsed time of the track number 2.

Also, "6 minute, 10 second, 00 frame" of INDEX 2 is compared with the above TCP and, since TCP is greater of the two, TC "8 minute, 10 second, 00 frame" of INDEX 3 is compared with the above TCP. Since TCP is smaller of the two, the index number will be made equal to "2".

Thus, to convert the additional information read out from the optical disk 2 by means of the optical pickup 3 of the disk replaying apparatus 1 into data corresponding to Q code of the sub-data of a CD, the data of the area TOC is read out by the additional information detector/processor 8 firstly when the disk is placed in position and stored in the memory 2. For an ordinary track replaying operation, the time code in the header is read out by additional information detector/processor 8 and converted into channel status data and user data Q code equivalent to that of CDs by the user data converter/generator 9, referring to the information on the track list in the area TOC data stored in the memory 10.

Thus, the conventional digital recorder that receives the digital interface output by way of the output terminal 11 identifies the CD category by decoding the channel status data and detects the sub-data of the CD including the track number and the elapsed time by decoding the Q code of the user data. Thus, it automatically records the start Id and the track number corresponding to the detected data on the recording medium to a great advantage for the operation of the digital recorder.

For example, the value obtained by subtracting the start address of the N-th address in the track list from the time code address being reproduced will correspond to the elapsed time on the track.

Note that channel status data is more often than not uniquely defined by the category and the parameters of the equipment to be used. For example, channel status data can be generated for a new optical disk by fixing the category code to CD, the sampling frequency to 44.1 KHz and the emphasis to off.

This operation of the present invention will be briefly discussed by referring to FIG. 10.

Firstly, in Step 101, it is determined if the CD layer or the HD layer of the mounted optical disk that is to be replayed. If is determined in Step 101 that the CD layer is specified by the user for replaying, the operation proceeds to Step 102, where the TOC area of the CD layer is replayed firstly to access the program area and retrieve the necessary data therefrom on the basis of the obtained TOC information. Then, in Step 103, the sub-data annexed to the main data of the digital audio signal reproduced from the program area in Step 102. If, on the other hand, it is determined in Step 101 that the HD layer is specified by the user for replaying, the operation proceeds to Step 105, where the TOC area of the CD layer is replayed firstly and then in Step 106, the area TOC information is stored in the memory. In Step 107, the program area is accessed and the necessary data is retrieved therefrom on the basis of the obtained control information on the area TOC. Then, in Step 108, the program number and the passed-by addresses of the program being replayed are generated on the basis of the recording addresses expressed in terms of absolute addresses of each program stored in the memory and the absolute addresses reproduced from said program area.

Figure 20:
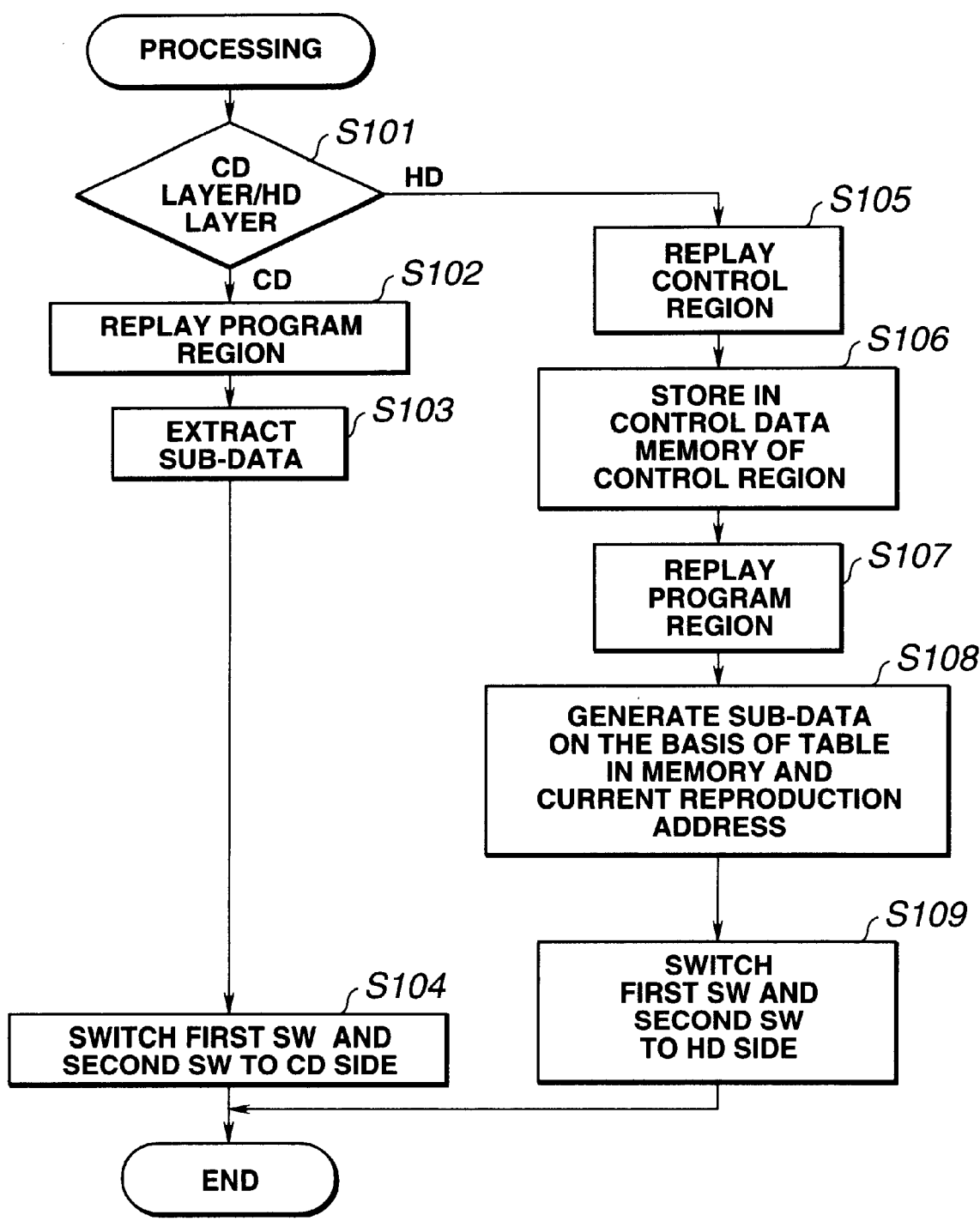
FIG. 20 is a flow chart of the processing procedure according to the invention.

Thereafter, in Step 109, the first switch and the second switch of FIG. 1 are turned to the HD side under the control of the control section. While the flow chart of FIG. 20 is described above in terms of a multi-layer disk, the flow chart applies to the use of a CD and an HD disk by modifying Step 101 to determine if the CD or the HD disk is to be replayed.

With the above described method, the additional information of a novel optical disk can be converted into channel status data and user data equivalent to those of a CD, which can then be used as digital audio interface output.

While a multi-bit digital signal of 16 bits with a sampling frequency of fs (Hz) conforming to the existing CD standards and output from the digital interface output section is produced and stored in some other recording medium in the above embodiment, it may alternatively be so arranged that a piece of music is divided on the basis of the sub-data including channel status data and user data output from the sub-data converter/generator 9 when the 1-bit digital audio signal sampled with a sampling frequency of fs multiplied by 64 (64×44.1 KHz=2,8224 MHz) and output from the audio signal output section 6 in FIG. 1 is recorded on some other recording medium.

Thus, according to the present invention, when replaying a disk storing digital audio signals recorded according to an HD system that is different from the CD system, the additional information including the track number and the elapsed time of each piece of music are detected and converted into data equivalent to channel status data and user data conforming to the CD standards for the digital audio interface, which data are then output to the digital interface output. With this arrangement, the advantage of automatically recording the start Ids and the track numbers on the recording medium can also be maid available when recording a digital recorder such as DAT or mini-disk.

What is claimed is:

1. A disc recording medium having two layers, wherein a first layer comprises:
   a first program area for recording at least one program having a program number and a running time corresponding to each program recorded therein, wherein each program is encoded according to a first format; and
   a first management area for recording management data for managing an absolute time corresponding to each program recorded in said first program area;
   wherein a second layer comprises:
   a second program area for recording at least one program having only absolute time without a program number and a running time, wherein each program is encoded according to a second format; and
   a second management area for recording management data for managing an absolute start time and for use in calculating a program number corresponding to each program in said second program area.

2. The disc recording medium according to claim 1, wherein said program recorded in said first program area of said first layer comprises PCM digital audio information.

3. The disc recording medium according to claim 1, wherein said program recorded in said second program area of said second layer comprises 1-bit digital audio information.

4. A disc recording medium comprising:
   a program area for recording therein at least one program and an absolute time without a program number and for recording therein a running time corresponding to each program; and
   a management area for recording therein data for managing an absolute start time for each program and for calculating a program number corresponding to each program recorded in the program area.

5. The disc recording medium according to claim 4, wherein the program is modulated by $\Delta\Sigma$ modulation.

* * * * *